United States Patent [19]

Kummer et al.

[11] Patent Number: 5,130,535
[45] Date of Patent: Jul. 14, 1992

[54] METHODS OF AND APPARATUS FOR MEASURING BENDING LOSS ALONG A LENGTH OF OPTICAL FIBER

[75] Inventors: Raymond B. Kummer, Lilburn; Marcus W. Shute, Sr., Norcross, both of Ga.

[73] Assignee: AT&T Bell Laboratories, Murray Hill, N.J.

[21] Appl. No.: 595,163

[22] Filed: Oct. 10, 1990

[51] Int. Cl.$^5$ ............................................. H01J 5/16
[52] U.S. Cl. ................................. 250/227.16; 356/73.1
[58] Field of Search ...................... 250/227.16; 356/73.1

[56] References Cited

U.S. PATENT DOCUMENTS

| | | | |
|---|---|---|---|
| 4,741,615 | 5/1988 | Calzavara et al. | 356/73.1 |
| 4,838,690 | 6/1989 | Buckland et al. | 356/73.1 |
| 4,902,327 | 2/1990 | Levinson | 356/73.1 |

OTHER PUBLICATIONS

Kowaliuk and Ferner, "A Technique to Estimate the Cutoff Wavelength Profile in Single Mode Fibers Using A Switchable Dual Wavelength OTDR," *Technical Digest, Symposium on Optical Fiber Measurements*, 1988, Boulder Colo. NBS Speial Pub. 748 pp. 15-18.

"Backscattering Measurements In Optical Fibers: Separation of Power Decay From Imperfection Contributions," *Electronics Letters*, Jul. 19, 91979, vol. 15, No. 15, pp. 467-469.

Buckland and Nishimura, "Bidirectional OTDR Measurements Utilizing An Improved Folded-Path Technique", *Technical Digest of the Symposium on Optical Fiber Measurements*, Boulder Colo. NBS Special Pub. #748, 1988, pp. 123-124.

*Primary Examiner*—David C. Nelms
*Assistant Examiner*—K. Shami
*Attorney, Agent, or Firm*—Edward W. Somers

[57] ABSTRACT

Variations in bending loss for relatively small radii bends along a length of optical fiber (26) are determined by using an optical time domain reflectometer (20) to measure the backscattering power as a function of distance along the fiber in one direction along the length of fiber by launching light energy into one end of the fiber. Then the backscattering power is measured as a function of distance along the fiber in the opposite direction from an opposite end by launching light energy into an opposite end of the fiber. Mathematical representations of backscattering forward and reverse signals for corresponding points along the length of the fiber are added to provide a quantity which is related to mode field diameter of the fiber. Variations in the mode field diameter are indicative of variations in the bending loss along the length of fiber. By measuring the bending loss at the end points of the length of fiber, the absolute bending loss along the length of fiber can be estimated from the above quantity.

17 Claims, 2 Drawing Sheets

BIDIRECTIONAL OTDR ANALYSIS

BEND LOSS VS. LENGTH

METHODS OF AND APPARATUS FOR MEASURING BENDING LOSS ALONG A LENGTH OF OPTICAL FIBER

TECHNICAL FIELD

This invention relates to method of and apparatus for measuring bending loss along a length of optical fiber. More particularly, this invention relates to non-contact methods and apparatus for the measurement of bend-induced loss along the length of an optical fiber which may be wound in a plurality of convolutions.

BACKGROUND OF THE INVENTION

After only a somewhat recent introduction, optical fiber has had a meteoric rise as the predominant means of transmission media in voice and data communications. Optical fiber is manufactured by drawing the fiber from a preform which is made by any of several well known processes. Afterwards, or as part of a tandem process, the drawn fiber is coated, cured, measured and taken up, desirably in an automatic takeup apparatus, on a spool to provide a package. Typically, an optical fiber has a diameter on the order of 125 microns, for example, and is covered with a coating material which increases the outer diameter of the coated fiber to about 250 microns, for example.

Also, it is common to use an optical fiber package in operations such as ribboning, cabling, and rewinding and to ship optical fiber to other companies which further process the fiber. The optical fiber typically is used in voice and data communications systems, both commercial and military. For example, the package may be used in weapons systems in which it is used for guidance and for data communications. Such uses include communications lines between a projectile, such as a missile, and a control station at a launch site, for example. Optical fiber provides the advantages of increased data bandwidth, reduced weight and greater range than wire-guided systems of the prior art.

A typical optical fiber application in a weapons system involves the packaging of a continuous length of optical fiber on a bobbin which is positioned inside a vehicle. One end of the fiber is attached to operational devices in the vehicle, whereas the other end of the fiber is connected to a control or communications station at a launch site. During and after launch, two-way communications with the vehicle are conducted. Such a vehicle commonly is referred to as a tethered vehicle.

In order to use such an arrangement, there must be provided a stable package of the optical fiber which may be disposed within the vehicle and which will permit reliable deployment of the optical fiber during the flight of the vehicle. An adhesive material disposed on surface of the convolutions must provide tack which is sufficiently low to permit payout without causing extreme bends at peel-off points. On the other hand, not enough tack may result in failure through dynamic instability on the bobbin. With respect to optical performance, optical attenuation at the peel-off point may occur through localized macrobending, degrading the integrity of data and video transmission.

There are disadvantages, not present in other forms of communication, in using optical fiber, particularly in a tethered vehicle application. Optical fiber is less robust than metallic conductors, rendering it subject to breakage. Aside from breakage, optical fiber communication performance may be degraded by microbends in the fiber which are generated by bending or by other stresses to which the fiber may be subjected. Microbending in the layers of undeployed fiber on the bobbin during deployment can affect adversely optical performance. Such damage to an optical fiber not only reduces the long-term durability of the fiber, but also causes losses in the strength and in the content of the optical signal. Likewise, physical or optical integrity may be affected adversely by any sharp bends which are experienced as the fiber is deployed from its packaged configuration.

Optical fiber wound on such a bobbin must be measured for expected bend loss due to small radii bends occurring at the peel-off point during high speed deployment. Although in actual deployment, each point along the outer surface of a length of fiber is potentially subjected to momentary bending at the peel-off point, it is now customary in the art to measure such loss only at end points of the fiber package. In a typical bending loss test, fiber is wound around a mandrel of a predetermined radius. Measurements are made prior to and subsequent to the bending of the fiber to determine the loss.

Bending loss measurements such as those just described are not totally acceptable for optical fiber wound on a spool such as one which may be used in tethered vehicles. What is desired is a technique for measuring bend-induced loss from the peel point along the entire length of an optical fiber with minimal contact of the optical fiber.

What seemingly is not included in the prior art are methods and apparatus for measuring bend-induced loss along a length of optical fiber instead of confining such measurement to end portions of the fiber. Of course, the sought after methods and apparatus should not be expensive nor unwieldy to implement. Desirably, such measurements could be carried out with commercially available optical fiber test equipment.

SUMMARY OF THE INVENTION

The foregoing problems of the prior art have been overcome by the methods and apparatus of this invention. A method of determining variations in bending loss for relatively small radius bends along the length of an optical fiber includes the step of measuring backscattering power as a function of distance along the fiber in one direction along the length of the fiber. Also, the backscattering power as a function of distance along the fiber is measured in the opposite direction along the length of the fiber. Then mathematical representations of the backscattering forward and reverse power signals for points along the fiber are processed to provide a quantity which is inversely proportional to the square of the mode field diameter so that variations thereof are indicative of variations in mode field diameter. Variations in mode field diameter are indicative of variations in bending loss along the length of the optical fiber. For small diameter bends, such as those typically of concern in tethered vehicle applications, variations in mode field diameter, as determined by the methods and apparatus described herein, are in fact the predominant cause of variations in bending loss.

Apparatus for determining variations in bending loss for relatively small radius bends along the length of optical fiber includes facilities for measuring backscattering power as a function of distance along the fiber in one direction along the length of the fiber and for measuring the backscattering power in an opposite direction. Facilities are provided for adding the logarithms of the back scattering forward and reverse power signals for points along the fiber to provide a quantity which is inversely proportional to the square of the mode field diameter. Variations of the quantity so determined are indicative of variations of mode field diameter and variations in mode field diameter are indicative of variations in bending loss along the length of the optical fiber.

BRIEF DESCRIPTION OF THE DRAWING

Other features of the present invention will be more readily understood from the following detailed description of specific embodiments thereof when read in conjunction with the accompanying drawings, in which.

DETAILED DESCRIPTION

Figure 1:
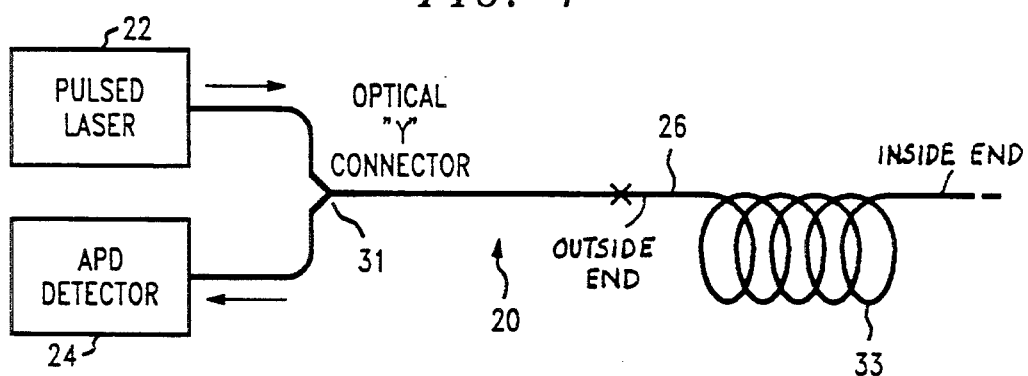
FIG. 1 is a schematic view of test apparatus connected to one end of optical fiber wound in a plurality of convolutions.
Figure 2:
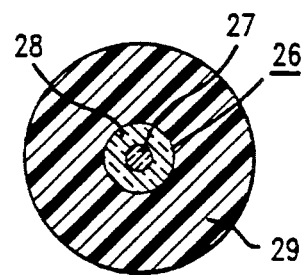
FIG. 2 is an end sectional view of optical fiber, a length of which is tested in accordance with the methods and apparatus of this invention.

Referring now to FIG. 1, there is shown in schematic form an optical time domain reflectometer 20 which includes a source 22 of light and a detector 24 which is connected to a length L of optical fiber 26. Typically, the optical fiber 26 includes a glassy core 27 (see FIG. 2) and cladding 28. A coating system 29 is disposed about the cladding 28 and comprises one or more layers of coating materials. As is seen, the optical fiber is wound in a plurality of convolutions. The methods and apparatus of this invention are used to measure bending loss along the length of the optical fiber. It should be noted that the methods and apparatus of this invention may be used to measure the bending loss along the length of optical fiber in which the core and cladding diameters as well as the diameter of the coated optical fiber may vary from those typical dimensions given hereinabove.

An optical time domain reflectometer (OTDR) causes short pulses of laser-generated light to be introduced into one end of a length of optical fiber and transmitted along the fiber at a relatively slow repetitive rate. Light which is reflected from minute density fluctuations along the length of the fiber and backscattered continuously from the optical fiber returns to the OTDR where it is detected. As in radar detection, the arrival of a signal from a location along the length of the fiber is proportional to its distance from the OTDR. A screen displays returned power as a function of distance along the length of the optical fiber. In a typical OTDR trace, a logarithmic plot of power versus distance along the fiber from one end generally slopes downwardly, being indicative of the inherent Rayleigh backscattered power of the optical fiber which diminishes with distance therealong because of the increasing attenuation.

Power is launched into the length of optical fiber through an optical splitter 31 (see FIG. 1) which first is connected to an outside end of the length of optical fiber which is wound in a plurality of convolutions 33—33. From any point along the length of fiber, some light is reflected back. The light which is reflected back is picked up by the splitter 31 and transmitted to the detector 24. The backscattered power is measured as a function of time. As a result, it is possible to measure optical power decay versus time.

Backscatter capture is inversely proportional to mode field diameter. Mode field diameter is approximately twice the radius at which intensity drops to $1/e^2 = 0.135$ of its peak value and is a measure of the width of the intensity of guided optical power in a single mode fiber.

For small diameter bends, such as the bend induced in the optical fiber 26 at a peel point of a package of wound fiber, macrobending loss variation along the length of a fiber is related primarily to variation in the mode field diameter (mfd). This variation in the mode field diameter is caused by variation in the refractive index profile of the fiber along its length. The relative variation of the mode field diameter, and thus of the refractive index profile of a fiber, can be determined by using a bidirectional OTDR analysis.

Not only has it been known that macrobending loss length variation is a function of mode field diameter, but also in the prior art is the knowledge that mode field diameter variation can be measured as a function of length by bidirectional OTDR analysis. What was not known is that for small diameter bends, mode field diameter variation is the dominant cause of bending loss variation. Also, what was not known and what is carried out by the methods and apparatus of this invention is that macrobending loss variations can be measured using a bidirectional OTDR analysis.

The power of a backscattered signal from an OTDR measurement is given by the following equation (1):

$$P(z) \propto P_o\, \alpha_s(z) B(z) \exp\left[-2\int_0^z \alpha_T(x)dx\right] \quad (1)$$

wherein $P_o$ = Launched power;

z is the distance along the fiber as measured from that end into which power is launched.

$\alpha_s(a)$ = Rayleigh scattering coefficient;

$B(z)$ = Backscatter capture fraction $$\propto \left(\frac{\lambda}{\omega}\right)^2;$$

where $\omega$ = Mode field diameter and $\lambda$ = Wavelength; and $\alpha_T(z)$ = Attenuation (total).

The measured OTDR loss of the optical fiber is determined from equation (2)

$$OTDR\ loss = -\frac{d}{dz}\{5\log_{10}[P(z)]\} \quad (2)$$

wherein the logarithm of P(z) defines an OTDR signal in either one direction or in an opposite direction along the optical fiber.

The change in equation (2) due to a change in the total attenuation has the same sign, i.e. positive or negative, regardless of the propagation direction of the OTDR light pulse. Therefore, the exponential decay term in equation (1), due to scattering and absorption, is insensitive to the fiber end into which the input pulse is launched. However, the B(z) term is sensitive to local imperfections resulting from changes in the mode field diameter and depends on the OTDR launch end, i.e. the sign of the change in equation (2) due to changes in the B(z) term depends on the propagation direction of the light. The addition of two semi-log OTDR signals, one obtained from one direction and the other from the opposite direction, provides an imperfection line 40 (see FIG. 3) for the optical fiber 26 of length L. Equation (3) hereinafter describes the imperfection line I(z) where $S_F(z)$ and $S_R(z)$ are the OTDR signals in the forward and reverse directions, respectively.

$$I(z) = S_F(z) + S_R(L-z) = 10 \log_{10}[\alpha_x(z)B(z)] + \text{const.} \quad (3)$$

wherein $S_R(L-z)$ is a mathematical transformation of $S_R(z)$ such that signals are added at corresponding points along the length of the fiber.

Variations in the optical fiber profile imperfection line 40 reflect changes in the mode field diameter and $\alpha_s$. It has been shown that the contribution of the variation of $\alpha_s$ to the imperfection line can usually be neglected when compared to the contribution due to variation of the mode field diameter. Because the peel point bending loss is also related to the mode field diameter, the fiber profile imperfection line also can be used to determine the relative variation in the peel point bending loss. Also, because $\alpha_T$ is related to $\alpha_x$, variations in $\alpha_s$ would result in variations in $\alpha_T$ which would cause variations in the "true" loss as determined from the slope of the quantity $S_F(z) - S_R(L-z)$. Therefore, it is possible to detect contributions from variations in $\alpha_s$. However, attributing all observed variation in I(z) to the B(z) term in equation (3), i.e. mode field diameter variations, leads to a conservative estimate of the bending loss variation, that is, the actual bending loss variation will be no larger than that estimated by the methods described herein.

The bidirectional OTDR analysis may be performed on each length of optical fiber. Direct peel point simulation bending loss measurements may be made on end samples of each optical fiber. Then, the imperfection line from the bidirectional OTDR analysis along with end sample measurements of the absolute peel point bending loss may be used to estimate the maximum bending loss over the entire length of fiber.

To begin the application of the method to a package of a length L of optical fiber, a bending loss measurement is made at each end of the length of fiber under consideration. In order to do this, transmitted power along the fiber is measured. Then a portion of the length of fiber is wound around a mandrel (not shown) having a predetermined diameter, and the transmitted power is measured again.

The measurement of bending loss of each end portion of the optical fiber is made with a mandrel having a circular cross section transverse to a longitudinal axis thereof and having a particular diameter. A decision is made as to the length of each end portion of he optical fiber which is to be held in engagement with an outer surface of the mandrel and a mass which is suitable to cause such engagement of the mandrel surface is determined and is applied to that end of the optical fiber under test.

In a next step of the method, after measurements have been taken at one end of the length of fiber, the splitter is removed from an outside end of the wound fiber and reconnected to an inside end. This allows the factor B(z) in equation (1), which is proportional to mode field diameter, to be extracted inasmuch as the exponential terms, which are direction dependent, cancel out. Although the use of bidirectional averaging to separate out a portion that is proportional to mode field diameter has been known, the methods and apparatus of this invention cause the bidirectional averaging to be related to bending loss. It has been found that backscattering capture fraction for small diameter bends is proportional to the inverse of mode field diameter and that the bend loss throughout the length of the fiber can be determined by conducting measurements from both ends.

Figure 3:
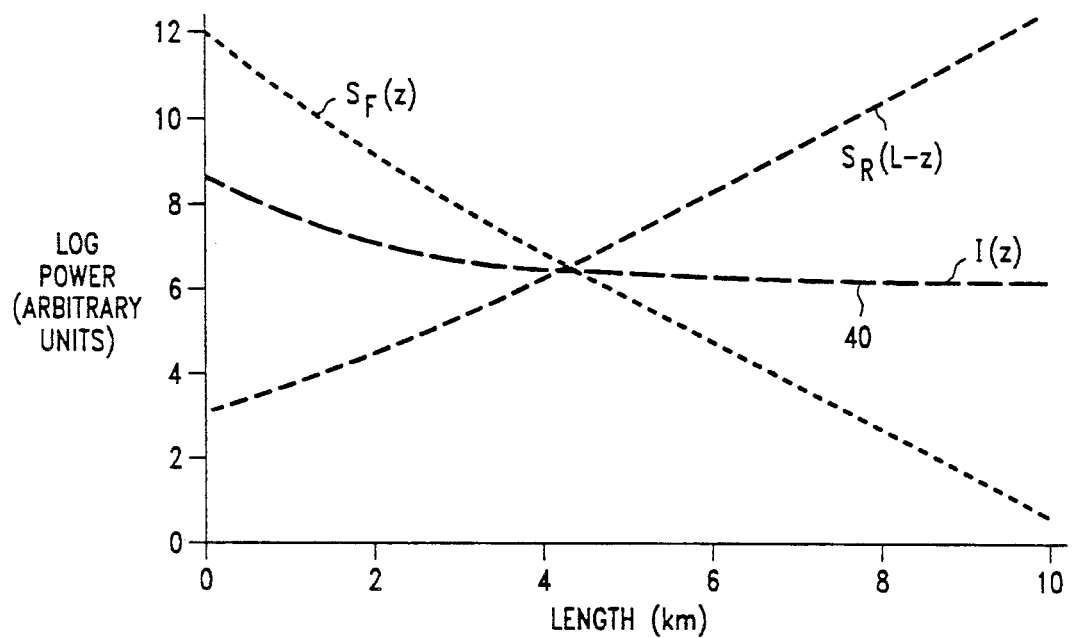
FIG. 3 is a graph which depicts the results of a bidirectional OTDR analysis.

Ideally, the curve 40 in FIG. 3 which depicts I(z) shows little variation. A differential of zero along the curve would be indicative that the backscattering capture fraction is constant with length. This in turn would indicate that the mode field diameter is constant and hence that bending loss variation along the entire length of optical fiber is negligible.

Figure 4:
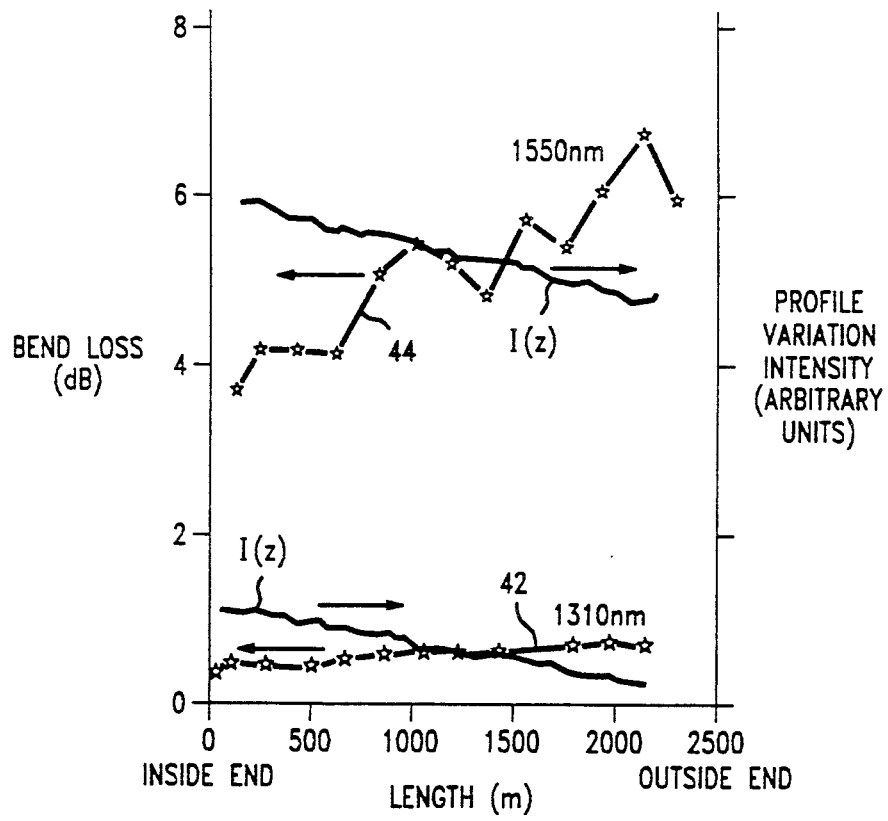
FIG. 4 is a graph which depicts bending loss versus length at each of two different wavelengths.

In FIG. 4, there are shown two plots of the variation in mode field diameter, I(z), along the fiber length L as determined by the methods and apparatus of this invention for wavelengths of 1310 nm and 1550 nm. Also for each of the two wavelengths, there is plotted the bending loss in dB as measured directly at a plurality of points along the length of the fiber. This is accomplished by a destructive method in which relatively short lengths are cut successively from the outside end of the length of fiber under test and using the techniques described hereinbefore for measuring bending loss at each newly formed outside end of each newly formed length of fiber. These are designated by the numerals 42 and 44 for wavelengths 1310 and 1550 nm, respectively. As can be seen, the two variables track very well within a range of experimental error.

What has been done to overcome the problems of the prior art is to use bidirectional OTDR testing. The OTDR 20 which includes the source 22 and the detector 24 is used to launch power through an optical splitter. From any point along the length of the fiber, some of the launched light is reflected back to the OTDR. Backscattered power is measured as a function of time. Backscatter capture fraction is a function of the inverse of mode field diameter and variation in mode field diameter is telltale of variations in bending loss for small diameter bends. Inasmuch as it is known that variations in the imperfection line are related to the mode field diameter and hence to bending loss, the bending loss along the entire length of the fiber between the end points can be determined.

It is to be understood that the above-described arrangements are simply illustrative of the invention. Other arrangements may be devised by those skilled in the art which will embody the principles of the invention and fall within the spirit and scope thereof.

We claim:

1. A method of determining variation sin bending loss for relatively small radii bends along the length of an optical fiber, said method including the steps of:
   measuring the backscattering power as a function of distance along a length of optical fiber in one direction along the length of the fiber by launching light energy into one end of the fiber length;
   measuring the backscattering power as a function of distance along the length of optical fiber in the opposite direction along the length by launching light energy into a an opposite end of the fiber length; and adding mathematical representations of backscattering forward and reverse power signals for corresponding points along the length of the fiber to provide a quantity related to the mode field diameter so that variations in the quantity imply variations in mode field diameter, the variation in said quantity being indicative of the variation in bending loss along the length of the fiber.

2. The method of claim 1, which also includes the step of measuring the bending loss at each end of the fiber to provide reference points to which variations in the mathematical representations are related.

3. The method of claim 2, wherein prior to the steps of measuring the bending loss and measuring the backscattering power, the length of optical fiber is wound in a plurality of convolutions.

4. A method of determining variation sin bending loss for relatively small radii bends along the length of an optical fiber, said method including the steps of:

measuring the backscattering power as a function of distance along a length of optical fiber in one direction along the length of the fiber by launching light energy into one end of the fiber length;

measuring the backscattering power as a function of distance along the length of optical fiber in the opposite direction along the length by launching light energy into an opposite end of the fiber length; and adding logarithms of backscattering forward and reverse power signals for corresponding points along the length of the fiber to provide a quantity related to the mode field diameter so that variations thereof imply variations in mode field diameter, the variation in said quantity being indicative of the variation in bending loss along the length of the fiber.

5. The method of claim 4, wherein an optical time domain reflectometer is used to measure backscattering power.

6. The method of claim 4, wherein a pulsed optical source is used to launch an optical signal into one arm of a splitter which is connected to one end of the length of fiber and wherein a detector is connected to the other arm of the splitter to measure backscatter power signals.

7. The method of claim 4, wherein the bending loss is measured at each end of the fiber.

8. The method of claim 7, wherein each end portion of the length of optical fiber is wrapped in at least a fraction of a convolution about a mandrel having a circular cross section transverse to a longitudinal axis thereof in order to determine bend-induced loss at said each end portion.

9. The method of claim 8, wherein a mass is used to maintain contact along a predetermined portion of the circumference of a mandrel.

10. The method of claim 9, wherein the magnitude of the mass is a function of the length of the predetermined portion of the circumference of the mandrel.

11. An apparatus for determining variations in bending loss for relatively small radii bends along the length of an optical fiber, said apparatus including:

means including means for launching light energy into an end of a length of optical fiber for measuring the backscattering power as a function of distance along the fiber in one direction along the length of the fiber, and for measuring the backscattering power as a function of distance along the fiber in the opposite direction along the length of the fiber; and circuit means for processing mathematical representations of the backscattering forward and reverse power signals for corresponding points along the length of the fiber to provide a quantity which is related to the mode field diameter of the optical fiber so that variations in the quantity imply variations in mode field diameter, the variation in said quantity being indicative of the variation in bending loss along the length of the fiber.

12. An apparatus for determining variations in bending loss for relatively small radii bends along the length of an optical fiber, said apparatus including:

means including means for launching light energy into an end of a length of optical fiber for measuring the backscattering power as a function of distance along the fiber in one direction along the length of the fiber, and for measuring the backscattering power as a function of distance along the fiber in the opposite direction along the length of the fiber; and circuit means for adding the logarithms of backscattering forward and reverse power signals for corresponding points along the length of the fiber to provide a quantity which is inversely proportional to the mode field diameter so that variations thereof imply variations in mode field diameter, the variation in said quantity being indicative of the variation in bending loss along the length of the fiber.

13. The apparatus of claim 12, wherein a pulsed optical source is used to launch an optical signal into a arm of a splitter which is connected to one end of the length of fiber and wherein a detector is connected to another arm of the reflector to measure backscatter power.

14. The apparatus of claim 12, wherein an optical time domain reflectometer is used to measure backscattering power.

15. The apparatus of claim 12, which also includes means for determining bending loss at each end portion of the length of optical fiber which is wound in a plurality of convolutions.

16. The apparatus of claim 15, wherein said means for determining bending loss at each end portion includes a mandrel having a circular cross section transverse to a longitudinal axis thereof about which an end portion of the length of fiber being measured for bending loss is wrapped, and further includes a mass which is applied to the end of the end portion of the fiber to maintain at least a portion of the end portion of the fiber in engagement with an outer surface of the mandrel.

17. The apparatus of claim 15, wherein said mass is determined by the length of optical fiber which is to be held in engagement with the outer surface of the mandrel.

* * * * *